No. 787,944. PATENTED APR. 25, 1905.
W. G. PRICE.
MOTOR SUSPENSION FOR TRUCKS, &c.
APPLICATION FILED OCT. 17, 1903.
2 SHEETS—SHEET 1.
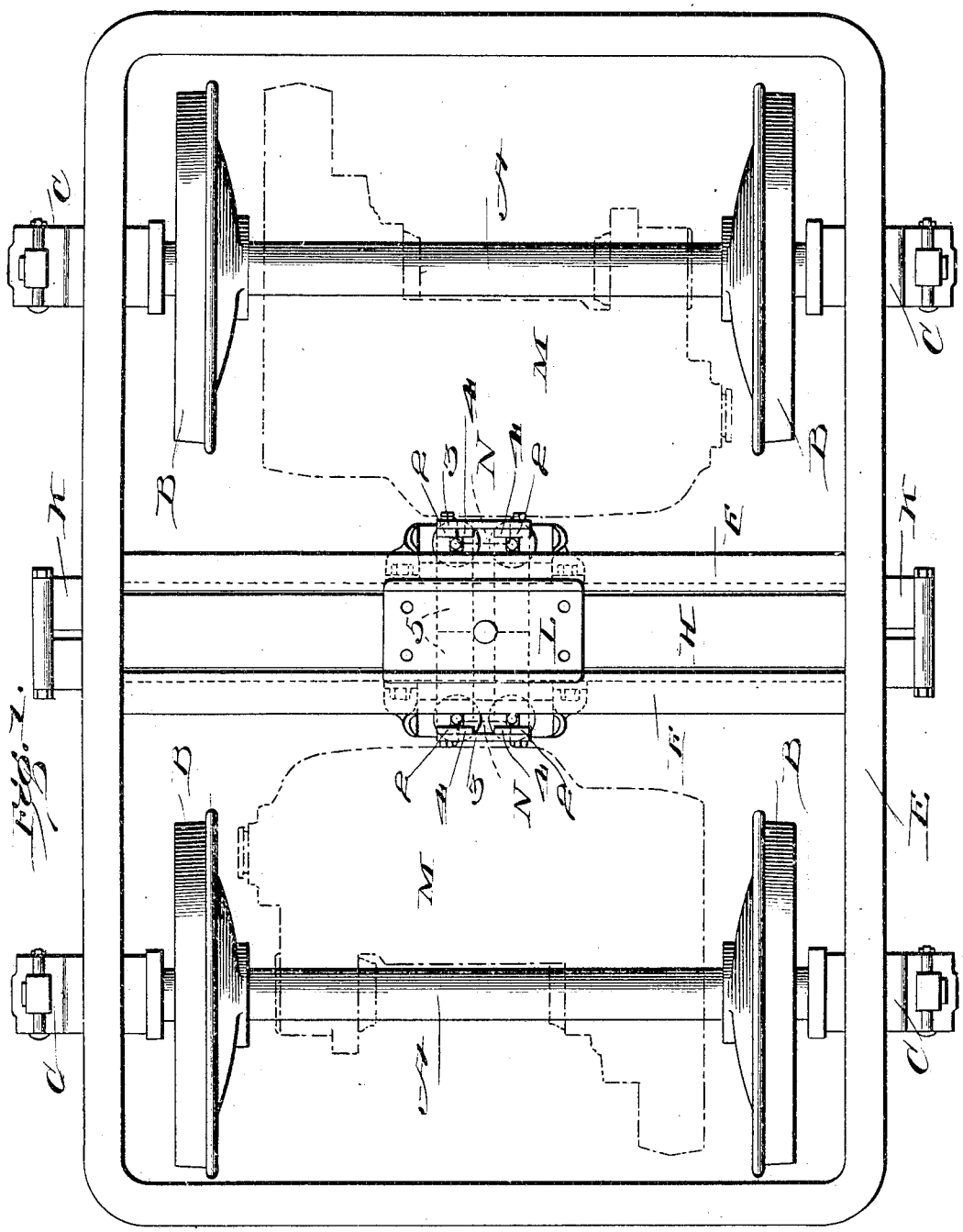

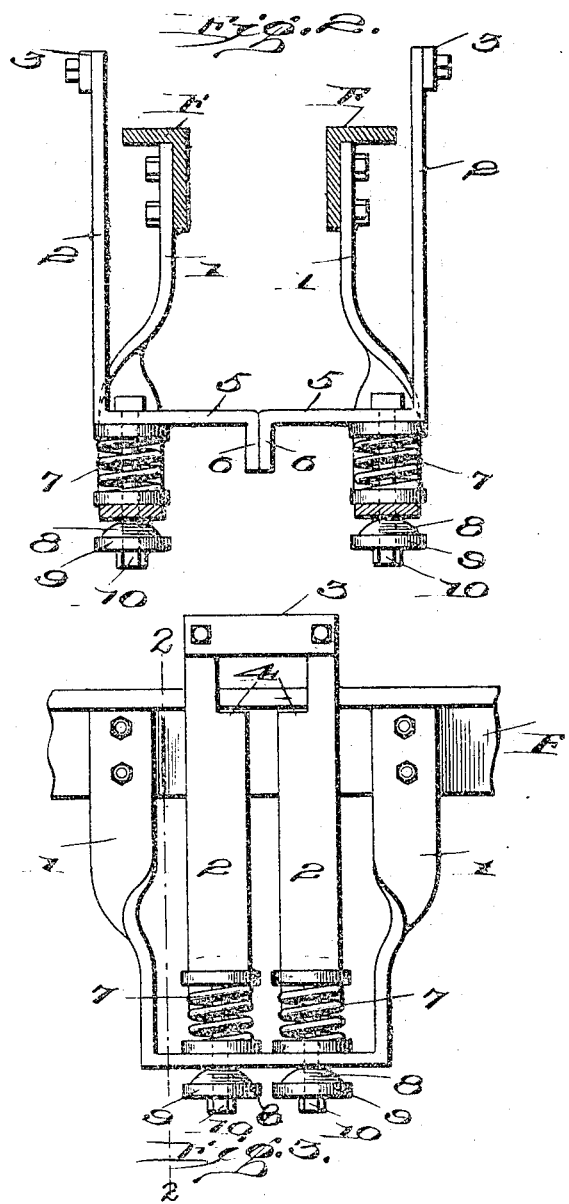

No. 787,944. Patented April 25, 1905.

UNITED STATES PATENT OFFICE.

WILLIAM G. PRICE, OF KINGSTON, NEW YORK, ASSIGNOR TO THE PECKHAM MANUFACTURING COMPANY, OF KINGSTON, NEW YORK, A CORPORATION OF NEW YORK.

MOTOR SUSPENSION FOR TRUCKS, &c.

SPECIFICATION forming part of Letters Patent No. 787,944, dated April 25, 1905.

Original application filed January 29, 1903, Serial No. 140,973. Divided and this application filed October 17, 1903. Serial No. 177,418.

*To all whom it may concern:*

Be it known that I, WILLIAM G. PRICE, residing at Kingston, in the county of Ulster and State of New York, have invented certain new and useful Improvements in Motor Suspensions for Trucks, &c., of which the following is a full, clear, and exact description, such as will enable others skilled in the art to which it appertains to make and use the same.

This invention relates to motor suspensions for trucks, &c., and is filed as a division of the original application, Serial No. 140,973, filed January 29, 1903.

The object of the invention is in general to improve the construction and efficiency of devices for suspending the motor or motors from the frame of a truck or other structure with which it is to be used.

Other objects and advantages will be in part obvious from the following description and in part pointed out.

The invention accordingly consists in the features of construction, combinations of elements, and arrangement of parts to be hereinafter described, and the novel features thereof pointed out in the claims.

In the accompanying drawings, which illustrate an embodiment of the invention, Figure 1 is a top plan view showing a four-wheel truck provided with two motors suspended in accordance with this invention. Fig. 2 is a sectional elevation of a detail of the motor-suspension, taken on the line 2 2 of Fig. 3. Fig. 3 is an elevation of the same with associated parts.

Similar reference characters refer to similar parts throughout the several views.

The truck shown in illustrating the invention is provided with axles A, wheels B, axle-boxes C, and frame E, connected by transoms F, the frame E being adapted to support the car-body in any desired way, as in the illustration, through the bolster H, carried by suitable springs K and provided with a draft attachment L, all as in a well-known construction.

As shown diagrammatically in Fig. 1, there are two motors M, one sleeved upon each axle and having their heels, as at N, adapted to be supported from the transoms F by the supports or suspension devices shown in detail in Figs. 2 and 3 and which form the specific subject-matter of this invention.

Connected to each transom are yokes or stirrups 1, substantially of U shape and having their upper ends bent so as to lie flat against the sides of the transoms, as shown. Each of the motor-supports proper consists of two members having vertical legs 2, the upper ends of which are connected by the cross-pieces 3 and which are notched, as at 4, for the reception of the heel of the motor. Each of these members has also a part 5 extending beneath the transoms, the ends being farther bent downwardly, as at 6. The arms or parts 5 are elastically supported or cushioned upon the lower cross member of the stirrup 1, being supported thereon, as shown by the spiral springs 7. The upward motion of the motor-support is resisted by a second spring, (shown as a spherical rubber cushion 8,) which is carried by a cap 9 upon the end of a bolt 10, which passes through the stirrup 1 and through the arms 5 of the motor-supporting bar. The construction at this end of the truck or at each side of the transoms is the same, and the parts are so related, as shown in Fig. 2, that the downwardly-turned ends 6 of the immediate motor-supporting members are positioned for frictional or rubbing contact with each other. Thus when the heel of the motor is supported in the notches 4 the motion thereof in various directions incident to the movement of the truck is cushioned by the springs 7 and 8, and the motors at the two ends of the trucks are balanced one against the other, the general strain upon the truck and the motors being lessened by the rubbing or frictional contact of the ends of the motor-supporting members at the point where they are brought into frictional engagement with each other.

It will be obvious to those acquainted with this art that various changes could be made, as in the form of elements or in the assembling of elements, which might materially change the appearance of the structure from that herein illustrated without altering the principle thereof or departing from the scope of this invention—as, for example, various kinds of springs may be used as equivalents of those shown, the invention may be used in connection with various kinds of trucks or other structures, and certain of the parts may be replaced by other parts known in the art for accomplishing the same objects.

Having described my invention, what I claim as new, and desire to secure by Letters Patent, is—

1. In a truck, in combination with the truck-frame and the transoms, an elastically-supported member on each side of the transoms adapted to support the heel of a motor, each of said members having a part connected therewith adapted to extend beneath said transoms, the ends of said parts being brought into frictional contact with each other.

2. In a truck-frame, in combination with the truck-frame and transoms, a means for supporting the heel of a motor on each side of the transoms, said means comprising members elastically supported from said transoms, and means whereby the weight and movement of the motor on one side of the transoms is balanced by the weight and motion of the motor on the other side of the transoms, the support means of each of said motors being free from connection with that of the other.

3. In a truck, in combination with the truck-frame and transoms, means for supporting the heel of a motor on each side of the transoms, said means comprising members elastically supported from the transoms, said members having their ends extended inwardly beneath the transoms, and a slipping or rubbing connection between said ends, whereby a movement of one motor without a corresponding movement of the other will be accompanied by friction between said ends.

4. In a car-truck, in combination with the truck-frame and transoms, a support for a motor on each side of the transoms, said supports comprising yokes 1 1 and elastically-supported members 2 2, said members 2 2 having their ends extended inwardly and brought together so as to provide a slipping and rubbing connection between said members.

5. In motor-supports, in combination, a plurality of motor-casings each supported upon an axle, a truck-frame and means extending from said motor-casings resiliently supported upon said truck-frame resting in contact one with another and free from positive connection.

6. In combination, a truck-frame, axles upon which said frame is mounted, motor-casings resting upon said axles and members connected with said motor-casings and resiliently supported from said truck-frame projecting beyond the point of their resilient support and having their free ends in contact with and unconnected to one another.

7. In a motor-support, in combination, a truck-frame, axles upon which said frame is mounted, motor-casings supported on said axles and members secured to said motor-casings and resiliently supported from said truck-frame having a frictional engagement one with another.

8. In motor-supports, in combination, a truck-frame, axles upon which said frame is mounted, motor-casings mounted on said axles, stirrups secured to the transoms of said truck-frame, and members fixed to each of said motor-casings resiliently supported upon said stirrups and having ends projecting inwardly with reference to the center of the truck, the free ends of said members fixed upon one motor-casing resting against the free ends of those fixed to the other motor-casing and having a frictional unconnected engagement therewith.

In testimony whereof I affix my signature in the presence of two witnesses.

WILLIAM G. PRICE.

Witnesses:
EMELINE RUTTER,
AMELIA M. KONSTANZER.